(12) United States Patent
Martinez et al.

(10) Patent No.: US 10,185,849 B2
(45) Date of Patent: Jan. 22, 2019

(54) SYSTEMS AND METHODS FOR CONTROLLING ANTENNAS

(71) Applicant: INTERMEC, INC., Lynnwood, WA (US)

(72) Inventors: Rene Martinez, Seattle, WA (US); Pavel Nikitin, Seattle, WA (US); Stephen J. Kelly, Marion, IA (US); Jason Harrigan, Sultan, WA (US)

(73) Assignee: INTERMEC, INC., Lynnwood, WA (US)

( * ) Notice: Subject to any disclaimer, the term of this patent is extended or adjusted under 35 U.S.C. 154(b) by 0 days.

(21) Appl. No.: 15/288,182

(22) Filed: Oct. 7, 2016

(65) Prior Publication Data

US 2018/0101705 A1  Apr. 12, 2018

(51) Int. Cl.
  *G06K 7/10* (2006.01)
(52) U.S. Cl.
  CPC .................. *G06K 7/10356* (2013.01)
(58) Field of Classification Search
  CPC .................. G06K 7/10; G06K 7/10356
  USPC ........................................ 340/10.5
  See application file for complete search history.

(56) References Cited

U.S. PATENT DOCUMENTS

| | | | |
|---|---|---|---|
| 6,560,444 B1 | 5/2003 | Imberg | |
| 7,071,791 B1 | 7/2006 | Wilson, III | |
| 7,656,858 B2 * | 2/2010 | Campero | G06K 7/0008 370/351 |
| 7,973,645 B1 | 7/2011 | Moretti et al. | |
| 8,010,116 B2 | 8/2011 | Scheinert | |
| 8,446,256 B2 * | 5/2013 | Pinkham | G06K 7/0008 340/10.1 |
| 8,497,762 B2 | 7/2013 | Campero et al. | |
| 8,967,485 B2 | 3/2015 | Piazza et al. | |
| 9,137,078 B2 | 9/2015 | Stapleton et al. | |
| 9,215,556 B2 * | 12/2015 | Sheikman | G01S 5/00 |
| 9,287,609 B2 | 3/2016 | Kolokotronis | |
| 2007/0257857 A1 * | 11/2007 | Marino | G06K 7/10336 343/867 |
| 2012/0095790 A1 * | 4/2012 | Stefik | G06Q 10/02 705/5 |

(Continued)

OTHER PUBLICATIONS

"Distributed Antenna System (DAS) keeping customers connected, wherever they are;" retrieved from http://www.att.com/gen/press-room?pid=23351 on Oct. 7, 2016.

(Continued)

*Primary Examiner* — Carlos E Garcia
(74) *Attorney, Agent, or Firm* — Oliff PLC; R. Brian Drozd

(57) ABSTRACT

Systems and methods for a distributed antenna network are provided. One system includes a plurality of antenna modules coupled via a communication line, with each antenna module configured to be switched between a through state and a connected state using radio-frequency identification (RFID) control signals. The system further includes a plurality of antennas, with each antenna connected to a corresponding antenna module. A controller is coupled to the communication line and configured to transmit RFID control signals to the plurality of antenna modules to selectively activate one of the antenna modules by switching the antenna module to the connected state to thereby activate an antenna connected to the antenna module in the connected state.

23 Claims, 8 Drawing Sheets

(56) References Cited

U.S. PATENT DOCUMENTS

| | | | |
|---|---|---|---|
| 2014/0260514 A1 | 9/2014 | Williams et al. | |
| 2015/0303569 A1* | 10/2015 | Jacobs | H01Q 1/28 343/858 |
| 2016/0379026 A1* | 12/2016 | Destraves | G06K 7/10128 235/451 |

OTHER PUBLICATIONS

"Skyworks Solutions, Inc.: RF Swtich: SPDT RF Switches: AS193-73LF;" RF & Microwave Products from Skyowrks; retreived from https://storeskyworksinc.com/PortalProductDetail.aspx?ProdId=262145 on Oct. 7, 2016.

"EM4325; 4 kbit Read/Write, EPC Gen2 and Total / ISO 18000-63 (Gen2) and ISO 18000-64 (Total) Passive or Battery-Assisted Passive RFID IC;" EM MicroElectronic; retreived from http://www.emmicroelectronic.com/products/rf-identification-security/epc-and-uhf-ics/em4325 on Oct. 7, 2016.

"Hybrid Couplers;" Anaren Model 2D1304-3; retreived from the Internet http://www.richardsonrfpd.com/resources/RellDocuments/SYS_21/2D1304-3.pdf.

U.S. Appl. No. 15/632,830, filed Jun. 26, 2017 in the name of Nikitin et al.

* cited by examiner

SYSTEMS AND METHODS FOR CONTROLLING ANTENNAS

BACKGROUND

Distributed antenna systems are used in the wireless field for many applications (e.g., to boost broadband mobile wireless coverage). For example, distributed antenna systems may include many antennas tuned to match the area, such as of a building or venue, where increased signal strength or a boosted service is desired or needed.

Additionally, radio-frequency identification (RFID) technology has many applications where wide area coverage is desired (such as airport parking or inside a large retail store or a warehouse) and can be achieved with distributed antenna systems. However, presently, in order to use RFID technology in a distributed antenna system environment, multiple readers or multiple antenna multiplexers (controllers) are needed. As a result, installation becomes very expensive and complicated because of the need to have, in addition to the antennas, many expensive controller devices (e.g., readers and/or multiplexers) and coaxial cables.

Thus, systems using distributed antennas with RFID technology require additional hardware that add cost and complexity to the systems.

SUMMARY

To overcome these and other challenges, aspects of broad inventive principles are disclosed herein.

In one embodiment, a system is provided that includes a plurality of antenna modules coupled via a communication line to a single controller. Each antenna module includes a coupler, a switching element and a radio-frequency identification (RFID) integrated-circuit (IC). An input of the antenna module is connected to an input of the coupler, an input of the switching element is connected to an output of the coupler, a first output of the switching element is connected to a first output of the antenna module and a second output of the switching element is connected to a second output of the antenna module. The RFID IC is connected between the coupler and the switching element, with each antenna module configured to be switched between a through state and a connected state by radio-frequency identification (RFID) control signals from the controller. In the through state the switching element is connected to the first output of the antenna module and in the connected state the switching element is connected to second output of the antenna module. An antenna is coupled to the second output of a corresponding antenna module. The single controller is configured to transmit the RFID control signals to the plurality of antenna modules to selectively control one antenna module by switching the switching element of the antenna module between the connected state and the through state.

In another embodiment, a method for communicating in a distributed antenna system is provided. The method includes configuring a plurality of antenna switches as radio-frequency identification (RFID) smart switches, causing the plurality of antenna switches to appear as RFID tags to a controller. The method also includes selectively controlling one of the antenna switches to activate a connected antenna using an RFID signal transmitted by the controller to thereby allow communication with an RFID tag via the activated antenna.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numerals represent like parts in the Figures.

Various embodiments include systems and methods for a distributed antenna system, particular an RFID antenna configuration or system that forms a smart distributed RFID antenna system. In some embodiments, a "smart switch" is provided that uses a coaxial cable for both transmitting RF signals and control signals. With these "smart switch" devices, a smart reconfigurable distributed antenna system that can be driven by only one radio (reader) is provided that uses a reduced or minimum amount of coaxial cables to connect the antennas (e.g., antennas can be connected in a linear network architecture through these "smart switches"). For example, in various embodiments, the "smart switch" device has a unique addressable ID and can be controlled with RFID signals via a single coaxial cable. The "smart switch" device is configured to obtain power via the coaxial cable and has several ports. Accordingly, low cost switching devices can be used with one reader and one communication line, such as one stretch of coaxial cable (with inserted "smart switches") and multiple antennas to cover areas that require multiple antennas (e.g., airport parking lots).

Figure 1:
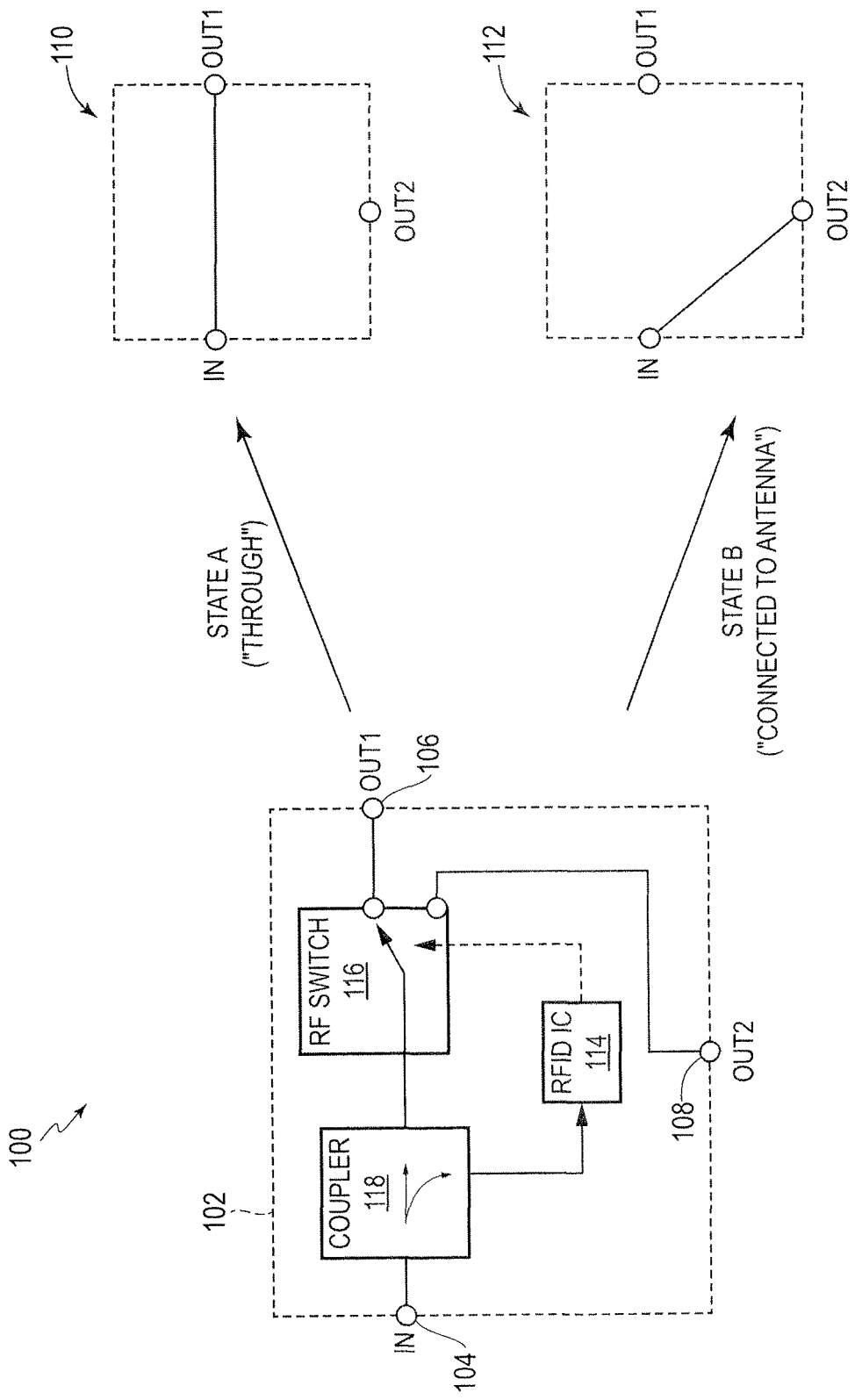
FIG. 1 is a block diagram illustrating a switch according to one or more embodiments.

In some embodiments, a smart distributed RFID antenna system 100 includes a plurality of switches 102, configured as "smart switch" devices that are controllable using RFID type signals as shown in FIG. 1. In some embodiments, the plurality of switches 102 are embodied as or form part of a plurality of antenna modules. With the switches 102, an antenna arrangement or configuration can be designed or reconfigured for different applications without the need for extensive external controllers and wiring. In the illustrated embodiment, the switch 102 is configured to operate or behave similar to or as an RFID tag. Thus, for example, an RFID type of transmitter/receiver may be used to selectively activate one or more antennas using the plurality of switches 102.

Figure 2:
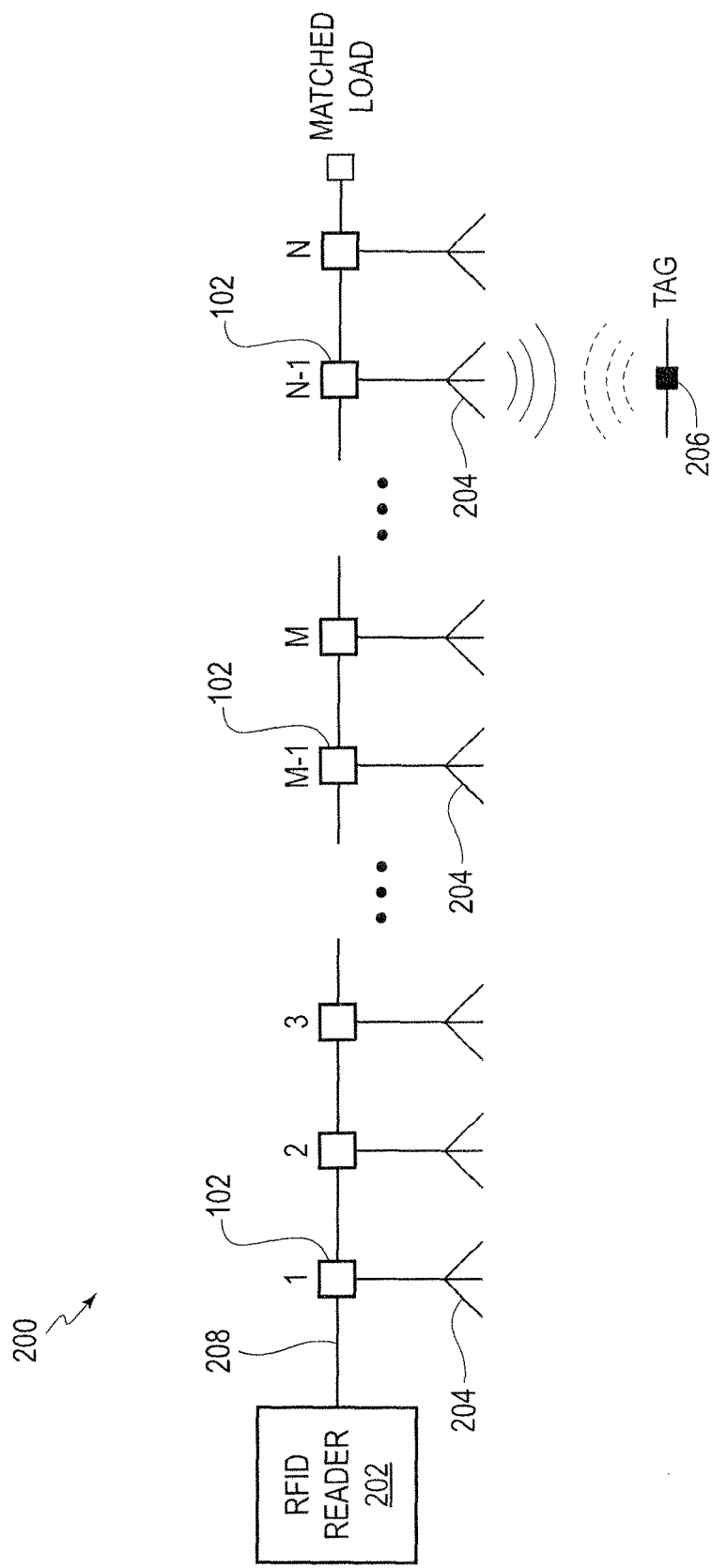
FIG. 2 is a diagram illustrating a distributed antenna network according to one or more embodiments.

In the embodiment of FIG. 1, the switch 102 is an antenna switch and in the illustrated embodiment is a three-port device with an IN port 104, an OUT1 port 106 (first output port) and OUT2 port 108 (second output port) as three ports. The switches 102 in various embodiments define a plurality of antenna modules or antenna switching modules. The switch 102 is configured to be switchable into two switching states. State A connects the input (IN port 104) via the OUT1 port 106 to the next switch 102 (in a series of interconnected switches 102, for example, as shown in FIG. 2) to thereby define a through state illustrated at 110 in which the antenna connected with the switch is in a deactivated state. The switch 102 is also configured to provide a state B that connects the input (IN port 104) to the OUT2 port 108 to thereby define a connected to antenna state as illustrated at 112 in which the antenna connected with the switch is in an activated state.

Thus, for example, as shown in FIG. 2, a distributed RFID antenna system 200 may be provided that allows an RFID reader 202 to selectively switch one or more of the plurality of switches 102 (connected along a single coaxial cable 206) to connect the RFID reader 202 with an antenna 204 connected with the selected switch 102. The RFID reader 202 is then able to communicate with an MD tag 206 using RFID signals and obtain RFID data from the RFID tag 206. The distributed RFID antenna system 200 may include any number (N) of antennas 204 (e.g., an RFID system covering N parking spaces inside an airport parking garage) implemented using the switches 102 configured as "smart switches" to selectively couple with the antennas 204 to communicate with one or more RFID tags 206.

As described herein, each switch 102 is a three-port device (e.g., a "T-junction") with three ports: IN 104, OUT1 106, and OUT2 108 and operable in two states: State A where the IN port 104 is connected to the OUT1 port 106 ("through" or "pass-through"), and State B where the IN port 104 is connected to the OUT2 port 108 ("connected to antenna"). As illustrated in FIG. 1, each of the switches 102 includes a controller or control module, which in the illustrated embodiment is an integrated circuit (IC), more particularly an RFID IC 114 that has a unique addressable II) (e.g., Gen2 EPC ID).

The switch 102 also includes a switching element, such as a switch, more particularly an RF switch 116 as illustrated in FIG. 1 that is controllable to switch between the output 106 and the output 108. For example, in one embodiment, the RFID IC 114 is an EM4325 Gen 2 IC (available from EM Microelectronic) with a Serial Peripheral Interface (SPI) that outputs signals to switch the RF switch 116 may (e.g., the RF switch 116 may be controlled by signals from RFID IC GPIO (general-purpose input/output) pins of the EM4325 Gen 2 IC). In this embodiment, the RF switch 116 is a pseudomorphic high-electron-mobility transistor (pHEMT) gallium arsenide (GaAs) switch, such as an AS193-73LF RF switch (available from Skyworks). In operation, MD control signals may be transmitted to the switch and received by the RFID IC 114, such that the RFID IC 114 operates as an RF front end and protocol handler for communication with one or more RFID tags as described in more detail herein. Thus, this configuration allows for the switch 102 to be switched between a connected and through states, such that an antenna coupled with a connected switch 102 is activated, thereby allowing communication (e.g., communication with one or RFID tags using RFID communication protocols). The RF switch 116 may be switched electrically and/o In one or more embodiments, including the above-discussed configurations, each of the switches 102 appears as an RFID tag to a controller, and as such, can be controlled using RFID signal protocols. For example, each of the switches 102 has a unique ID corresponding to the RFID IC 114 in the individual switches 102 (which may be communicated in a header portion of a transmit signal). Thus, in operation, communication with each of the switches 102 may be performed in a manner that would be used to communicate with an RFID tag. For example, in some embodiments, a Gen2 RFID communication protocol may be used to communicate with the RFID IC 114 to control switching of the RF switch 116. The communication in various embodiments includes, for example, an RFID communication setup sequence (including a handshake) to communicate with the switches 102. By sending an RFID signal addressed to a particular RFID IC 114, the switch 102 associated with that MID IC 114 may be controlled, such as between a through state and a connected state as described herein. The determination of the IDs associated with each of the RFID ICs 114, and thus, with each of the switches 102, may be stored in a lookup table or other memory to allow for lookup of the IDs for each of the MD ICs 114. The system.

Additionally, the switch 102 includes a coupler 118 (e.g., a resistive ladder with impedance matching, resistive divider or microwave coupler) that couples the input port 104 to the RFID IC 114 and to the output port 106 through the RF switch 116. The coupler 118 may be any coupling member that splits a portion of the incoming MD signal and communicates the signal to the RFID IC 114. For example, the coupler 118 may take a small portion of the signal (e.g., 20 dB lower in power) and communicate that portion to the RFID IC 114 to control the RFID IC 114, which allows for control of the RF switch 116 at a lower insertion loss (e.g., multiple switches 102 can be coupled to the same communication line without signal loss). Thus, the RFID signal received by the switch 102 flows through the coupler 118 to the RF switch 116, with a portion of the RFID signal split off from the main RFID signal and sent to the RFID IC 114. The main portion of the RFID signal that passes through the coupler 118 and to the RF switch 116 is then communicated to a next switch 102 (if in a through state) or to an antenna (if in a connected state).

It should be appreciated that the configuration of the switch 102 illustrated in FIG. 1 allows for bi-directional communication through the switch 102, for example, to and from an RFID, such as the RFID tag 206 (shown in FIG. 2) by selectively activating an antenna coupled with the switch 102. It should be noted that in various embodiments, the RF switch 116 and the RFID IC 114 are powered from a DC voltage biased on the coaxial cable 206 independent of the RF signal (see embodiment of FIG. 9). However, in other embodiments, the DC voltage is injected into the RF signal that is communicated to the switches 102 (e.g., DC signal injected to RF signal from an MD reader).

In operation, the switch 102 appears to the system as an MD tag (with memory fields) and can be controlled using RFID control signals. For example, a unique bit value may be written to a memory filed of an MD IC 114 (by sending a an RFID signal uniquely addressed to the RFID IC 114 using RFID transmission protocols) to select one of the switches 102, which communicates to the MD IC 114 a control signal to switch the RF switch 116. For example, the RFID IC 114 receives an RFID signal that causes the RFID IC 114 to control the switch 102 (by controlling the RF switch 116) to change states from the current state to the other state (e.g., from State A to State B or State B to State A). For example, as shown in FIG. 2, the first set of switches 102 (1 . . . M) are in a through state (State A) and the switch 102 (N−1) is in a connected to antenna state (State B), such that the antenna connected to the N switch 102 is activated. In this state of the switches 102, signals and data are communicated through the first set of switches 102 and to the N switch 102, such that RFID communication may be provided between the MD reader 202 and the RFID tag 206 (e.g., RFID signals/data, general purpose command signals, etc.). As such, the switches 102 are capable of being used in a known fixed installation by selectively addressing one or more of the RFID ICs 114 in the switches 102 to activate a particular antenna 204 coupled with one of the switches 102 based on the unique ID of the RPM IC 114 for the switch 102. In the connected state of the switch 102 having the activated antenna 204, one or more RFID tags (e.g., RFID tags on car windshields parked at one or ore parking spots in a parking lot), such as the RFID tag 206 within an RFID reading range of the antenna 204 are activated and the RFID reader 202 is able to communicate with the RFID tag 206 using RFID communication protocols. Thus, using RFID control signals, the RFID reader 202 is able to communicate with one or more RFID tags by selectively activating an antenna 204 and without requiring modification to the RFID reader 202 to allow the selective activation of the antennas 204.

With respect to identifying which MID tag 206 is responding and communicating with the system, various different methods may be used, but are not limited to the one discussed herein. For example, in some embodiments the antenna may be a directional antenna that is able to determine the direction from which signal are received (e.g., is the signal coming from an RFID tag 206 is a parking spot to the left, to the right, or in front of the antenna). In other embodiments, the signal strength may be used to determine the location of the responding RFID tag 206 (e.g., the weaker the signal strength the further away the MID tag 206 is located and, thus, located in a parking spot not in front of the antenna). In still other embodiments, a received signal strength indicator (RSSI) may be used to determine the location of the responding RFID tags 206. In yet other embodiments, the phase of the RFID response may be used to determine the location of the RFID tags 206 that are responding. In other embodiments, a single antenna is provided for each expected RFID tag 206 (e.g., one antenna per parking spot).

It should be noted that the switches 102 may be used in different applications with a base station communicating with the switches 102 using appropriate commands or signals for the particular operating environment. For example, as described in more detail herein, the switches 102 may be used in different RFID applications or in non-RFID applications.

In order to communication with one or more RFID tags, such as before reading one or more RFID tags, the RFID reader 202 in various embodiments sends a control signal, setting the states of the switches 102. For example, as described herein, in order to activate antenna N−1 (connected with switch MN−1 switches 1 through M are set to the "through" state, switch N−1 is set to the "connected to antenna" state, and switch N is in a through state or in an unpowered state. For example, the control signal is sent through the coaxial cable 206 and passes through the coupler 118 of each of the switches 102. In each switch 102, a portion of the control signal is split and sent to the MD IC 114. The RFID IC 114 having the unique ID addressed within the control signal (as described herein) is thereby controlled, which result in the RF switch 116 being switched between states in various embodiments. Thus, because the RFID IC 114 appears to the RFID reader 202 as an RFID tag, an RFID protocol read signal can be used to control the RFID IC 114. For example, the RFID signal received by the RFID IC 114 commands the RFID IC 114 to switch the state of the RF switch 116.

It should be noted that when power is switched off (either DC bias on coaxial cable 206 or RF carrier), the switches 102 are reset (e.g., to a through state). Additionally, it should be noted that if DC bias is injected into the RF signal then there is no powering of switches 102 after a connected switch. However, if DC bias is provided independent of the RF signal, all of the switches 102 on the coaxial cable 206 are powered when the DC bias is sent.

Figure 3:
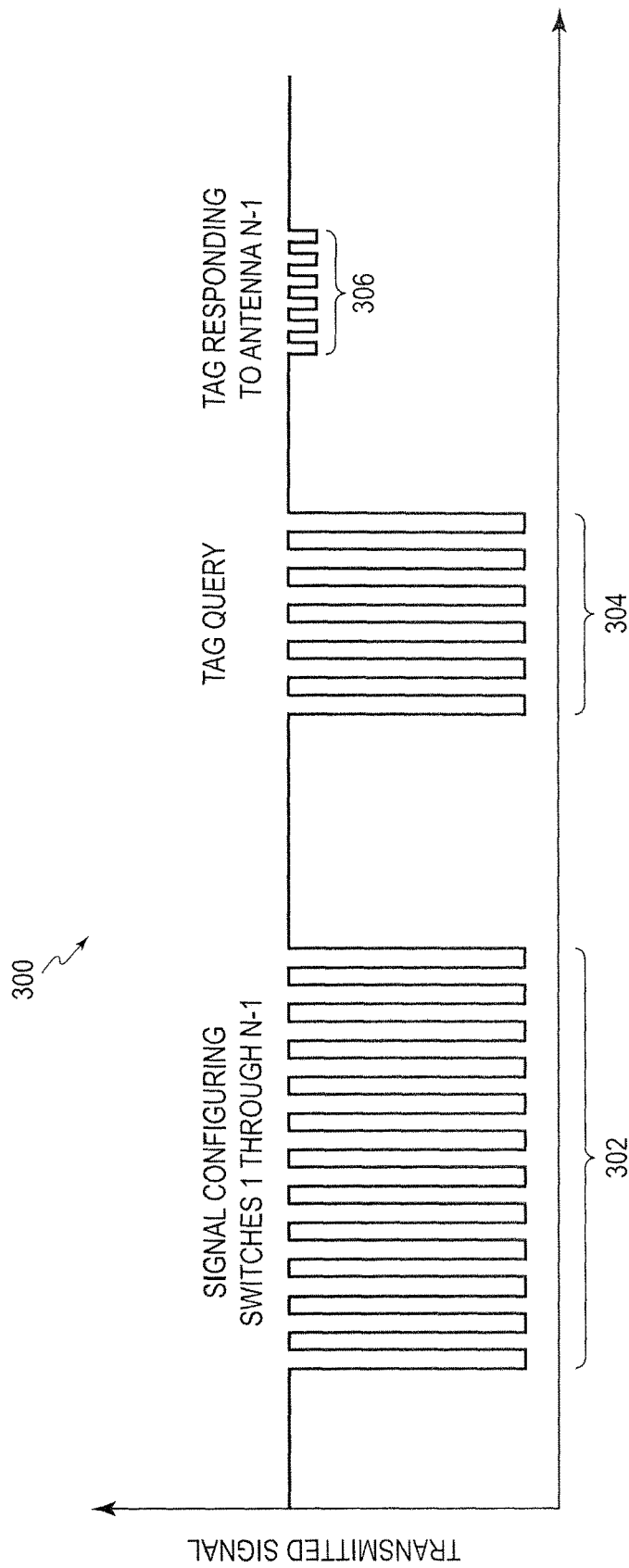
FIG. 3 is a diagram illustrating signals in a distributed antenna network according to one or more embodiments.

An example of a signal sequence 300 that may be used in one or more embodiments in shown in FIG. 3. The signal sequence 300 illustrates transmitted signals including signals 302 for configuring switches 1 through N−1 to select switch N−1 as shown in FIG. 2. The signals 302 are sent to selectively control one of the RFID ICs 114 having a unique ID that is identified in the RFID signal, for example, using MD reader addressing signals. Once selected, the RFID IC 114 switches the RF switch 116 to a connected state (if in a through state) such that the output of the switch is connected to the antenna 204 (shown in FIG. 2). It should be noted that a series of signals may be sent or individual signals for controlling the switches 102.

As can be seen in FIG. 3, once a switch 102 is switched to a connected state (thereby preventing the RFID signal from passing through the switch 102 and transmitting the signal to the antenna 204 connected with the switch 102), a tag query signal 304 (e.g., RFID read signal) may be sent through the switch N−1 to activate or read/query the RFID tag 206 (e.g., a passive RFID tag). For example, an RFID interrogation or read signal is transmitted from the antenna 204 (e.g., RFID antenna) to the RFID tag 206. Thus, because the switches 102 are controllable like an RFID tag, the signals configuring the switches 102 are RFID control signals, such as standard protocol RFID read signals.

In response, the RFID tag 206 transmits a signal such as a RFID response signal identifying the RFID tag (e.g., RFID tag response from an RFID tag on a vehicle parked in a parking spot), which in the illustrated embodiment of FIG. 2 is the RFID tag 206 responding to antenna N−1 signal 306. Thus, in the illustrated embodiment, switch N−1 is configured or switched to a connected to antenna state and the other switches 102 are configured or switched to a through state. As such, the communication arrangement of various embodiments that uses the switches 102 controllable as RFID smart switches does not require separate control lines, power and control switches, multiplexers or additional switching ports to allow for communication with a large number of antennas, and thus, is more easily implemented in a scalable architecture at a lower cost.

For example, in one or more embodiments, a scalable distributed antenna system is implemented using RFID technology in a daisy chained antenna arrangement using a single coaxial cable. Thus, various embodiments of a distributed antenna system do not need to use PIN-diode based "unintelligent" antenna switches which turn on and off based on the presence of DC bias on RF feed (and cannot be daisy chained), or antenna multiplexers that use external power and control lines to control the switching, or multiple antennas connected to a multiple-port radio, or daisy chained remote units each of which is a complex fully functional radio with a controller.

Thus, various embodiments of a distributed antenna system when installed to cover large area, may be installed at lower cost and complexity. For example, a distributed 8-antenna system (to cover 8 individual parking spaces in a garage) using standard 4-port RFID readers would require two readers and multiple lengths of coaxial cable or antenna multiplexers or one reader, but requiring external control wiring and interface as well as a significant length of coaxial cable. In accordance with various embodiments using smart switches, one reader and seven "smart switches" and a minimal length of coaxial cable are used.

Figure 4:
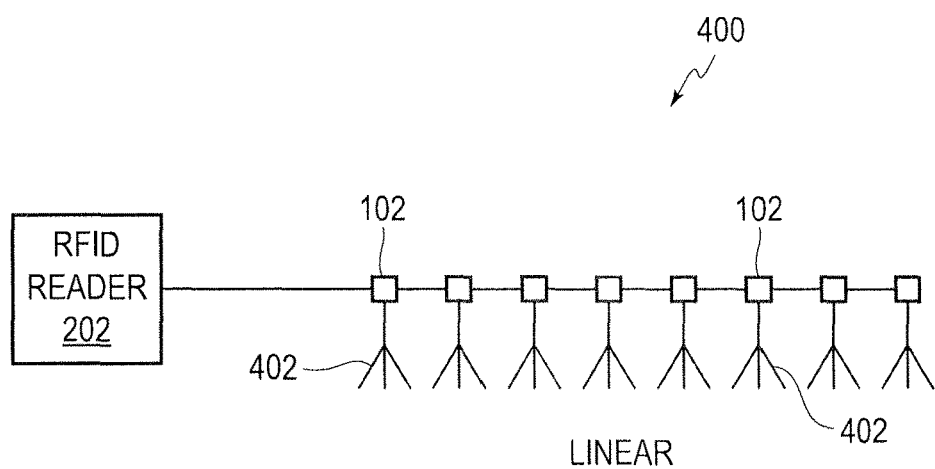
FIG. 4 is a diagram illustrating a distributed antenna network configuration according to one or more embodiments.

It should be noted that different configurations and arrangements of switches may be implemented. For example, FIG. 4 illustrates a linear network architecture 400 that includes the switches 102 connected in a single serial arrangement, each of which is connected to an antenna 402. For example, the plurality of switches 102 are connected in a linear network architecture with the first output 106 of each switch of the plurality of switches connected to another switch 102 in series.

Figure 5:
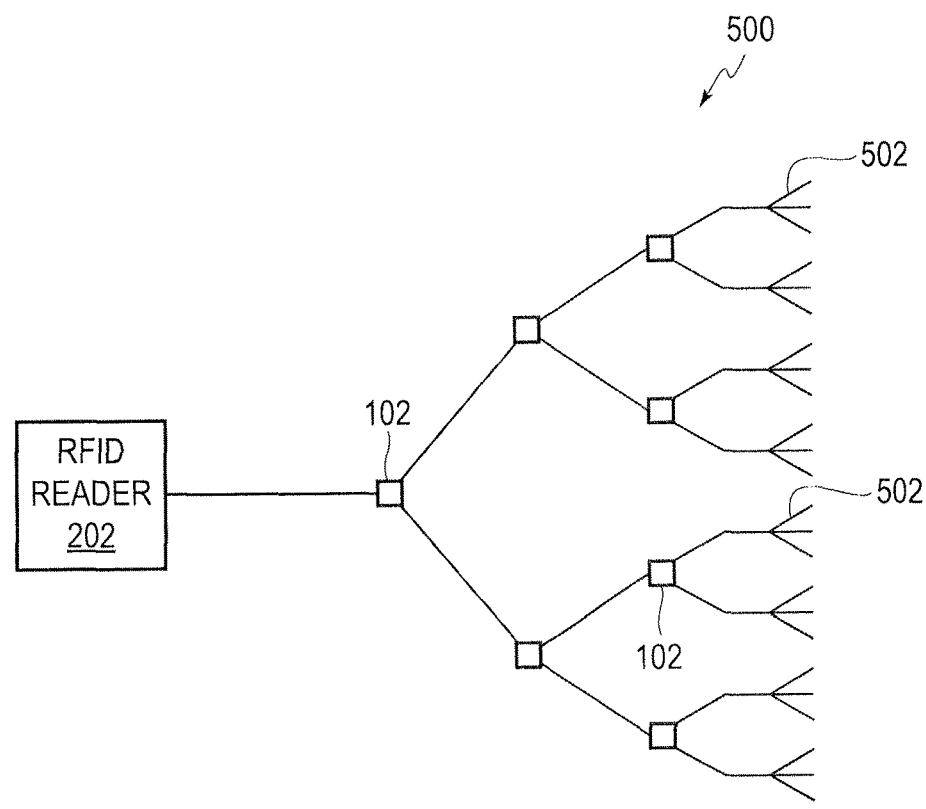
FIG. 5 is a diagram illustrating another distributed antenna network configuration according to one or more embodiments.

FIG. 5 illustrates a tree network architecture 500 wherein each switch 102 is connected to two switches 102 at the output, each of which are then connected to two switches 102, etc., which are then connected to a plurality of antennas 502. For example, the plurality of switches 102 are connected in a tree network architecture with the first output 106 of each switch 102 of the plurality of switches 102 connected to two other switches 102.

Figure 6:
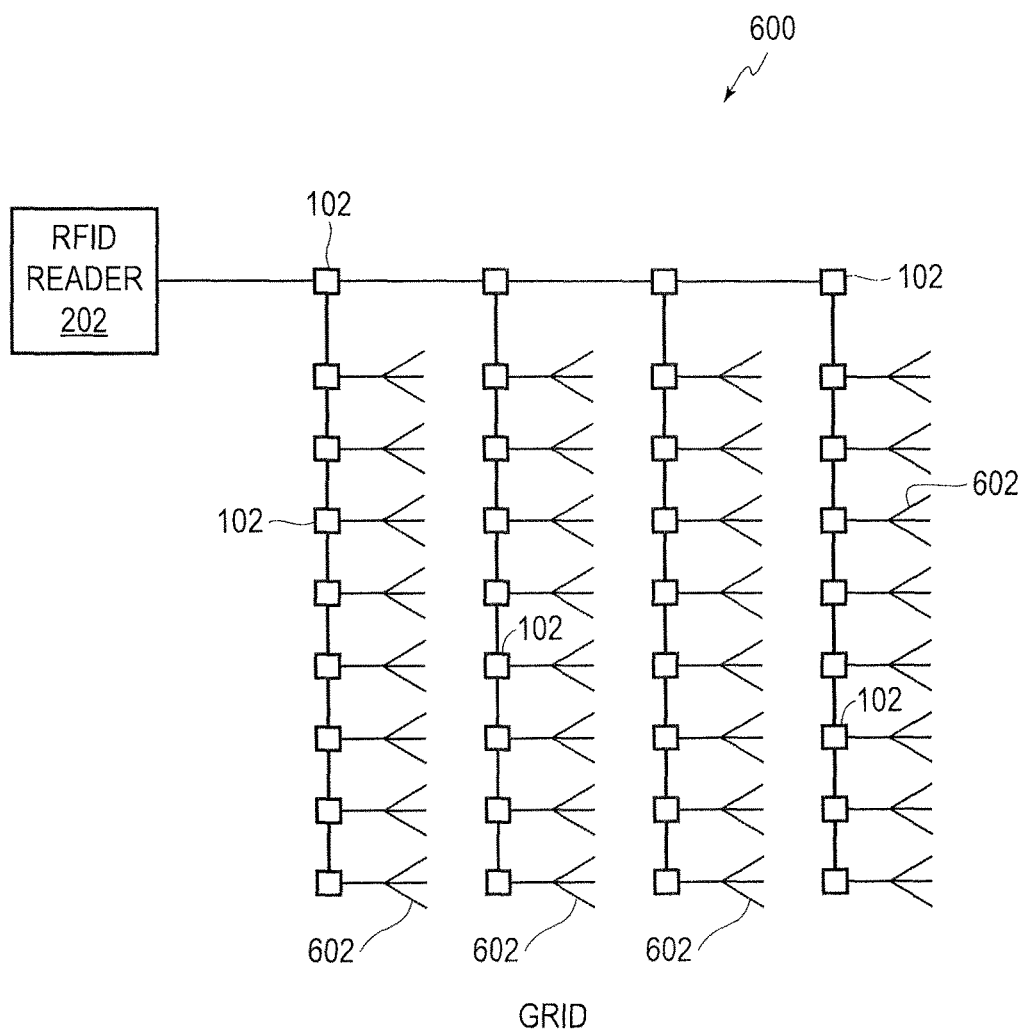
FIG. 6 is a diagram illustrating another distributed antenna network configuration according to one or more embodiments.

FIG. 6 illustrates a grid network architecture 600 wherein each switch 102 is connected to a plurality of additional switches 102, which are then each connected to an antenna 602. For example, the plurality of switches are connected in a grid network architecture with one or more of the switches having the first outputs 106 connected to another switch 102 and two or more of the switches 102 having the first output 106 connected to a plurality of other switches 102.

As should be appreciated, many different connection arrangements and configurations are contemplated by the present disclosure.

Various embodiments also are not limited to UHF (900 MHz) RFID and can be used for smart distributed antenna systems for other wireless technologies (e.g., WiFi, wireless WAN, Bluetooth, etc.) that operate in various other frequency bands (e.g., 2.4 GHz, 5.8 GHz, etc.) and may be implemented in accordance with the present disclosure. For example, a 2.4 GHz radio transceiver can send out modulated 2.4 GHz control signals to the RFID ICs 114 in smart switches which form and configure a smart distributed 2.4 GHz antenna system that then transmits/receives non-RFID signals (e.g., 2.4 GHz WiFi or Bluetooth).

The switches 102 can also be integrated into, for example, RFID antennas, and such RFID antennas can have properties (e.g., radiation pattern, polarization, frequency band) configured over the main RF input using the MD signals from the primary RFID reader to which the antennas are connected. For example, the switches 102 may be used to switch between phase shifters (by selecting different outputs of the switch) using RFID control commands to generate different antenna radiation patterns or polarizations (e.g., 0° to 90° or 90° to 0°). Thus, smart antennas with selectively steerable beams, controlled by RFID signals, may be provided.

Additionally, the ICs or circuits controlling the RF switches 116 inside the switches 102 do not have to adhere to passive backscatter RFID protocol and can use other protocol and frequencies. For example, communication with the switches 102 configured as smart switches can be one-directional (e.g., using a one-directional communication protocol). For example, the radio or RFID reader can send signals to configure the switches 102 without requiring an acknowledgement, such that the standard RFID handshake protocol would not be needed. In this way, the "smart switches" can be simple (and only need to be able to receive), and the radio communicating to the switches 102 does not need to support simultaneous transmit/receive (RFID-like) mode.

The switches 102 can also be powered via DC bias voltage on the RF coaxial 206 from different sources, such that in some embodiments, a DC bias signal is not used. For example, the switches 102 can be powered from battery, from connection to an external power grid, or from a dedicated power harvester (e.g., harvesting RF power from the coaxial cable, harvesting solar power, etc.).

It should be noted that the limit to how many switches 102 can be placed in series is defined by the link budget in various embodiments. For example, if a 915 MHz RFID reader output power is 30 dBm, "smart switch" insertion loss is 0.5 dB and a low loss RF coaxial cable is used with an attenuation of 4 dB/100 feet (such as LMR400), then twenty-two switches and 100 feet of coaxial cable can be used before the power delivered to the last antenna in a series is reduced to 15 dBm. To further extend the range of the system (to increase the limit on the length of the coaxial cable and the number of switches), a bidirectional amplifier (e.g., powered from DC biased coaxial cable or from the external power grid) can be used.

In various embodiments, the switches 102 do not differentiate among the various ports, for example, the three ports (e.g., characteristics/types of the ports). For example, any of the three ports can be used to either connect to the antenna or to other smart switches. Thus, specialized types of ports that connect only to an antenna or that connect only to similar network control modules (e.g., switches) in series is not needed. Thus, as should be appreciated, various embodiments provide a generic nature of the ports that enables different network topologies. Additionally, in various embodiments, all three ports transport both DC and RF signals. Thus, separate ports for each are not needed.

It should be appreciated that the switch control logic of various embodiments is always connected to the input port 104, and thus, is always discoverable. Accordingly, the switch control logic of all the smart switches (switches 102) connected together in series (or other topologies) are discoverable.

Figure 7:
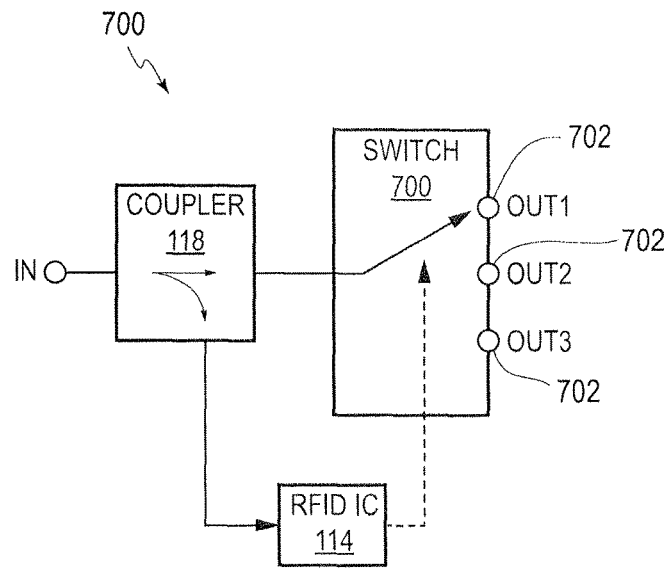
FIG. 7 is a block diagram illustrating a switch configuration according to one or more embodiments.

Variations and modifications are contemplated in accordance with the disclosure herein. For example, a switch 700 (configured as a smart switch) as illustrated in FIG. 7 can have multiple output ports 702. Thus, by selectively controlling the RFID IC 114 (using the unique ID for the RFID IC 114), for example by transmitting a control command to the RFID IC 114, one of the output ports 702 may be selected.

Figure 8:
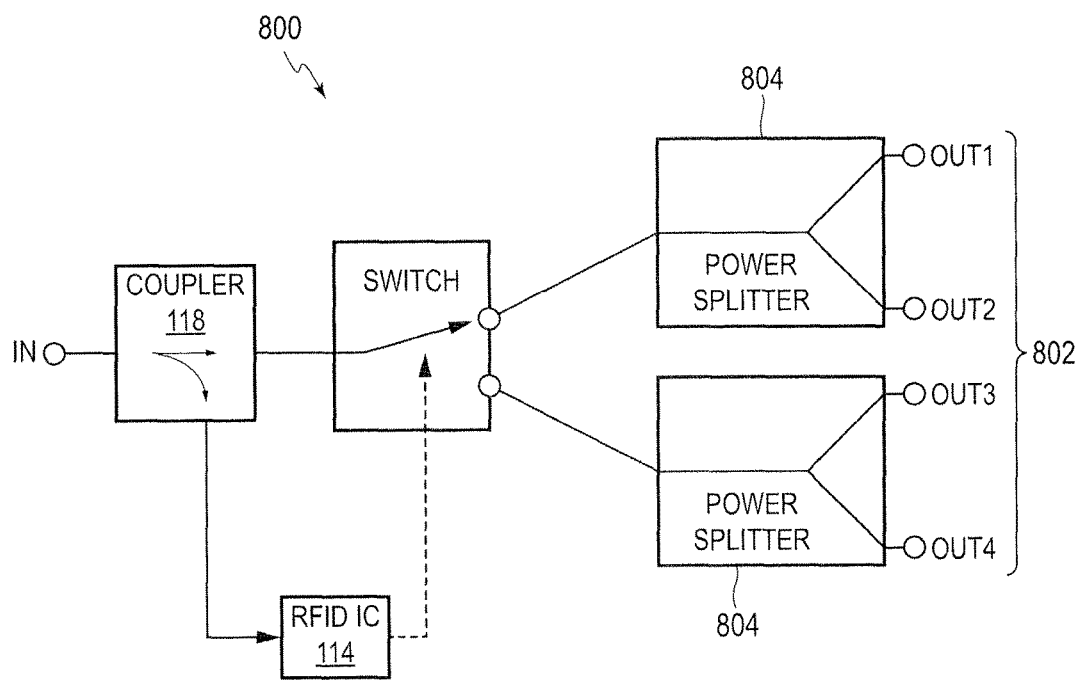
FIG. 8 is a block diagram illustrating another switch configuration according to one or more embodiments.

As another example, a switch 800 (configured as a smart switch) as illustrated in FIG. 8 can have more than one port 802 (out of multiple ports 802) enabled at the same time (using power splitters 804). For example, the RF power/signal can be divided between several output ports when the RFID IC 114 received an MD control signal. It should be noted that like numerals in the various Figures represent like parts.

Figure 9:
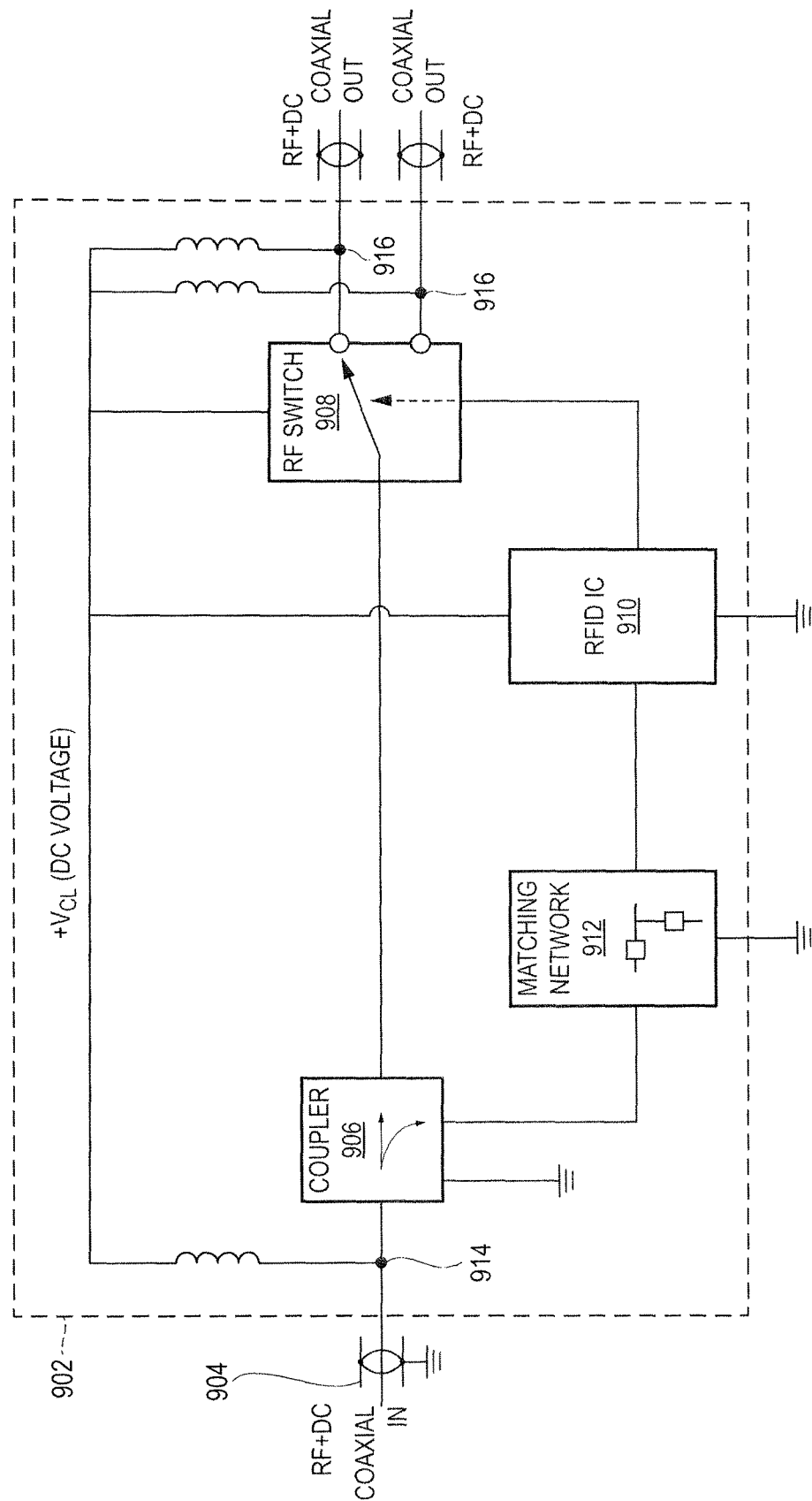
FIG. 9 is a block diagram illustrating another switch configuration according to one or more embodiments.

The switch 102 can be used to form part of or be embodied as a smart multiport switch 900, such as a smart RFID antenna as illustrated in FIG. 9 such that with only one coaxial input 904 into a switch 902, the multiport switch 900 can be reconfigured, for example, to change a radiation pattern as described herein. In the illustrated embodiment, the multiport switch 900 is controller by DC bias independent of the RF signal. In particular, a separate DC bias signal flows through inductors from the input to the outputs of the multiport switch 900 separate from the RF signal. Thus, the DC voltage (+Vcc) is provided between an input 914 and the outputs 916 (connected to coaxial cables).

The switch 902 includes a coupler 906 (which may be embodied as the coupler 118 of FIG. 1) connected to the coaxial input 904. The multiport switch 900 further includes outputs connected to an RF switch 908 (which may be embodied as the RF switch 116 of FIG. 1) and an RFID IC 910 (which may be embodied as the RFID IC 114 of FIG. 1 (through a matching network 912). The multiport switch 900 operates similar to the switch 102, but in this embodiment, the multiport switch 900 has multiple outputs. In some embodiments, for example, the multiple outputs may be connected to different phase shifters to thereby form a smart reconfigurable antenna that can generate multiple antenna patterns depending on the phase shifter selected.

It should be noted that Bluetooth low energy beacon, powered over DC over coaxial cable, can be added to each switch 102 or 902, to provide indoor location and relay BLE data through RFID to the network. The switch 102 or 902 can control the delivery of DC power to each of the output ports (e.g., using wideband switches operating in DC-through-RF band), and thus eliminates the need for DC bias/un-bias circuitry on each switch.

It should be noted that the functionality of various embodiments may be extended beyond port switching, and may include communication to a microcontroller over RFID, general purpose input/output (GPI( ) capabilities (control LEDs, read sensors), etc.

Thus, various embodiments provide an RFID antenna switch that can be used in applications for RFID where multiple individual read zones are needed or desired (e.g., airport garage with multiple parking spots). In various embodiments, a single reader is connected to multiple antennas spread over large areas. It should be appreciated that many topologies are possible. In operation, one or more smart switches are controlled by an MD protocol, allowing for easier implementation using a single coaxial cable for RF power and control. For example, multiple antennas can be fed and controlled from one single port of an MD reader with as little as 13 dBm.

It should be noted that while the various embodiments are described in connection with particular operating characteristics, the various embodiments are not limited to the specific operating environment. Thus, one or more embodiments may be used in connection with different devices or in different applications.

Figure 10:
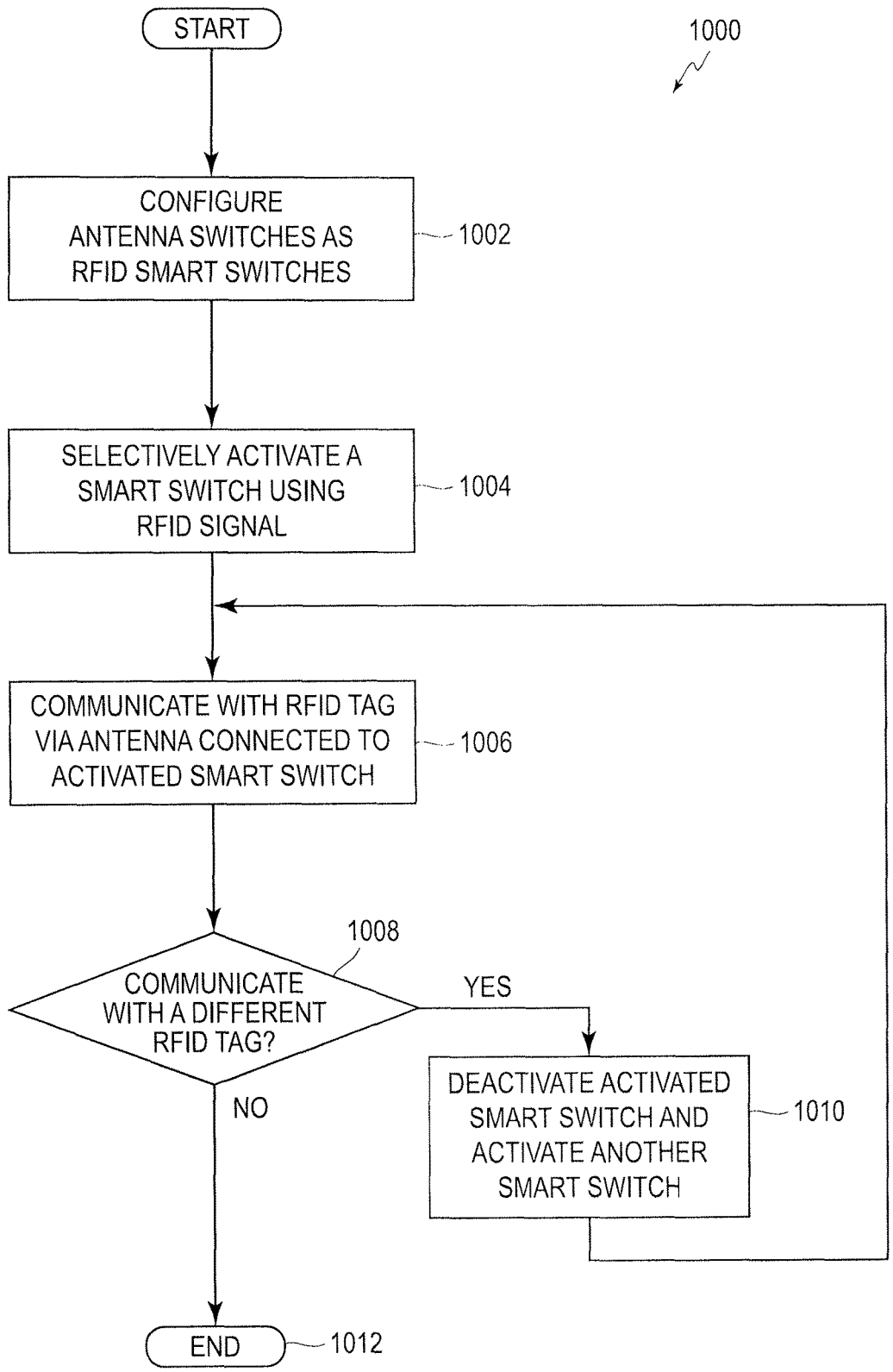
FIG. 10 is a flowchart of a method according to one or more embodiments.

A method 1000 for providing a smart distributed RFID antenna system is illustrated in FIG. 10. It should be appreciated that the method 1000 may be implemented by one or more the embodiments disclosed herein, which may be combined or modified as desired or needed. Additionally, the steps in the method 1000 may be modified, changed in order, performed differently, performed sequentially, concurrently or simultaneously, or otherwise modified as desired or needed.

The method 1000 includes configuring antenna switches as RFID smart switches at 1002. For example, as described herein, one or more MD smart switches (e.g., the switch 102 or 902) may be configured for connection to other RFID smart switches or to an antenna and appear to a control system as RFID tags. Thus, the RFID smart switches may be controlled using RFID signals that are typically used to control RFID tags, which instead switch the RFID smart switches between a connected or active state to allow a controller (e.g., RFID reader) to be coupled with an antenna and a pass-through or through state that allows the controller to connect to a different ones of the RFID smart switches. It should be noted that the RFID smart switches are operated such that one of the RFID smart switches is active at any one time by selectively controlling an RFID IC of a particular switch as described herein, which allows the controller to activate and communicate with a particular antenna. In operation, any RFID smart switch between the controller and the RFID smart switch to be connected to an antenna are set to the through state and any RFID smart switches after the RFID smart switch to be activated are either powered off in one embodiment or set to through state. Thus, by switching the states of the switches using MD protocol signals and/or commands, one of the smart switches is selected at 1004 using an RFID signal (e.g., an RFID signal used to control an RFID tag). The selected switch thereby activates an antenna connected thereto as described herein. For example, the RF switch in the smart switch allows communication from an input of the switch to a connected antenna.

Once one of the RFID smart switches is set to a connected state, the controller can communicate with an RFID tag via the antenna connected to the smart switch at 1006. For example, the controller may send a control, read, interrogation, or other command signal or RFID signal via the antenna to communicate with an RFID tag. In response, the RFID tag may provide RFID data or other information (e.g., data related to a particular parking spot associated with the RFID tag).

A determination is then made at 1008 whether to communicate with a different RFID tag. If no further communication is needed or desired, the method 1000 ends at 1012. However, if communication with another MID tag is desired or needed, the smart switch in a connected state is set to a through state (by sending an MD control command to the RFID IC to switch the RF switch to a through state) and another one of the RFID smart switches is set to a connected state at 1010 to allow communication with a different RFID tag via a different antenna connected that the different smart switch. It should be noted that each antenna may communicate with a single RFID tag or multiple RFID tags.

The method 1000 may be implemented or performed using one or more systems described herein, such as the smart switches. The steps also may be performed by a controller, such that the controller operates an RFID type reader or operates as a specialized processing machine/specialized hardware.

Thus, various embodiments provide smart switches that allow for a smart distributed RFID antenna system to operate using a single communication line (e.g., a single coaxial cable) to communicate with multiple antennas. The control systems and methods include using RFID signals to selectively activate the smart switches that are coupled with the multiple antennas to select an antenna for use in communication, such as with an RFID tag.

It should be noted that one or more embodiments can comprise one or more microprocessors (which may be embodied as a processor) and a memory, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, one or more configurations described herein can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can communicate between components using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described herein with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks and when implemented in one or more embodiments, results in a transforming or converting a general purpose computer/processor/hardware to a specialized computer/processor/hardware that improves the technological art.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A system comprising:
    a plurality of antenna modules commonly connected in parallel to a communication line, each antenna module comprising:
        memory storing an address unique to the respective antenna module;
        a radio-frequency (RF) antenna configured to read an RFID tag;
        an input configured to receive a control signal from an RFID reader via the communication line, the control signal comprising RFID control signals and an address unique to the antenna module;
        a switch, in a connected state, configured to connect the RFID reader to the RF antenna of an antenna module when the switch receives the control signal, wherein the RFID reader transmits an interrogation signal via the communication line and receives a response from the RFID tag via the communication line in response to the control signal, wherein the switch, in a through state, is configured to communicate the control signal to a next switch;
        a coupler coupled to the switch; and
        an integrated circuit (IC) coupled to the coupler,
    wherein the RFID reader is configured to transmit the control signal to the plurality of antenna modules along the communication line.

2. The system of claim 1, wherein the switch is configured to be switched between the through state and the connected state by the transmitted control signals based on the address contained in the control signal, wherein in the connected state, the RF antenna is connected to the RFID reader to read RFID tags, and, in the through state, the RF antenna is not connected to the RFID reader.

3. The system of claim 1, wherein the switch is a radiofrequency (RF) switch, and wherein the input of the antenna module is connected to the RF switch through the coupler, and the IC is connected between the coupler and the RF switch.

4. The system of claim 1, wherein the communication line is a single coaxial cable coupled with the RFID reader and wherein one or more antenna modules are connected on the single coaxial cable before a selected switch are in a through state and the one or more of the antenna modules connected on the single coaxial cable, after the selected switch are turned off.

5. The system of claim 1, wherein, the coupler is one of a resistive ladder, a resistive divider or a microwave coupler.

6. The system of claim 1, wherein the plurality of antenna modules are configured to appear as RFID tags to a system controller.

7. The system of claim 1, wherein the communication line is a single coaxial cable and wherein the one or more antenna switches connected on the single coaxial cable are powered by RF power harvesting from the control signals.

8. The system of claim 1, wherein the RFID tag is associated with a vehicle parking spot.

9. The system of claim 1, wherein the switch comprises an RFID integrated-circuit (IC) and further comprising a matching network connected between the coupler and the RFID IC.

10. The system of claim 1, wherein the plurality of antenna modules are connected in a linear network architecture with a first output of each antenna module connected to another switch in series.

11. The system of claim 1, wherein the plurality of antenna modules are connected in a tree network architecture with a first output of each antenna module is connected to two other switches.

12. The system of claim 1, wherein the plurality of antenna modules are connected in a grid network architecture with one or more of the antenna modules having a first output connected to another switch and two or more of the antenna modules having the first output connected to a plurality of other switches.

13. A method for communicating in a distributed antenna system, the method comprising:

sending, via a common communication line, a control signal from an RFID reader to a plurality of antenna modules that are connected in parallel on the common communication line with the RFID reader, the control signal comprising an address of a first antenna module of the plurality of antenna modules;

comparing, at the first antenna module, the address in the control signal with an address stored in memory of the first antenna module;

switching, via an antenna switch, the first antenna module to connect to an RF antenna in response to determining that the address in the control signal matches the address stored in memory of the first antenna module; and sending an interrogation signal, over the common communication line, to an RFID tag via the RF antenna of the first antenna module and receiving a response from the first antenna module, over the common communication line, after the switching is performed, wherein the antenna switch comprises a coupler and an integrated-circuit (IC), and the antenna switch is configured to be switched using the control signal between a through state and a connected state when a corresponding IC is uniquely addressed by the RFID control signal, wherein the antenna switch, in the connected state, is configured to connect the RFID reader to the RF antenna, wherein the antenna switch, in the through state, is configured to communicate the RFID control signal to a next switch.

14. The method of claim 13, further comprising deselecting the selected antenna switch by sending an RFID signal from the controller to the selected antenna switch and selecting a different antenna switch by sending another RFID signal from the controller.

15. The method of claim 13, further comprising switching between the through state and the connected state by the transmitted control signal based on the address contained in the control signal, wherein in the connected state, the RF antenna connected to the antenna switch in the connected state is connected to the RFID reader to read RFID tags, and, in the through state, the RF antenna is not connected to the RFID reader.

16. The method of claim 13, wherein the RFID reader sends the interrogation signal over the communication line to the first antenna module, and wherein the RFID reader receives a response from the RFID tag over the communication line from the first antenna module.

17. An antenna module comprising:
a radio-frequency (RF) antenna configured to read an RFID tag;
an input connected to an RFID reader through a common communication line, wherein the input is configured to receive a control signal over the common communication line, the control signal comprising an address of the antenna module;
a coupler coupled to the input;
an integrated circuit coupled to the coupler, wherein the integrated circuit comprises a memory configured to store a unique address of the antenna module; and
a switch coupled to the coupler, wherein the switch, in a connected mode, is configured to connect the RFID reader to the RF antenna of an antenna module when the switch receives the control signal, wherein the RFID reader transmits an interrogation signal via the common communication line to the RFID tag and receives a response, via the common communication line, from the RFID tag in response to the interrogation signal, and wherein the switch, in a through mode, is configured to communicate the control signal to a next switch.

18. The antenna module of claim 17, wherein in the through mode, the switch is configured to connect the coupler to an input of another antenna module, and wherein in the connected mode, the switch is configured to connect the RF antenna to the RFID reader through the coupler over the common communication line.

19. The antenna module of claim 18, wherein the integrated circuit is configured to compare the address received in the control signal with the unique address stored in the memory of the integrated circuit.

20. The antenna module of claim 19, wherein the integrated circuit switches the switch to the through mode when the address in the control signal does not match the unique address stored in the memory, and wherein the integrated circuit switches the switch in the connected mode when the address in the control signal matches with the unique address stored in the memory.

21. The antenna module of claim 17, wherein a matching network is connected between the coupler and the RFID IC.

22. The antenna module of claim 17, wherein the coupler is configured to divide the control signal into a first portion of the control signal and a second portion of the control signal, wherein the coupler is configured to transmit the first portion of the control signal to the integrated circuit, and wherein the coupler is configured to transmit the second portion of the control signal to the switch.

23. The antenna module of claim 17, wherein the coupler is one of a resistive ladder, a resistive divider or a microwave coupler.

* * * * *